United States Patent
Kim et al.

(10) Patent No.: US 10,692,002 B1
(45) Date of Patent: Jun. 23, 2020

(54) LEARNING METHOD AND LEARNING DEVICE OF PEDESTRIAN DETECTOR FOR ROBUST SURVEILLANCE BASED ON IMAGE ANALYSIS BY USING GAN AND TESTING METHOD AND TESTING DEVICE USING THE SAME

(71) Applicant: Stradvision, Inc., Gyeongbuk (KR)

(72) Inventors: Kye-Hyeon Kim, Seoul (KR); Yongjoong Kim, Gyeongsangbuk-do (KR); Insu Kim, Gyeongsangbuk-do (KR); Hak-Kyoung Kim, Gyeongsangbuk-do (KR); Woonhyun Nam, Gyeongsangbuk-do (KR); SukHoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: STRADVISION, INC., Pohang-si (KR)

( * ) Notice: Subject to any disclaimer, the term of this patent is extended or adjusted under 35 U.S.C. 154(b) by 0 days.

(21) Appl. No.: 16/259,372

(22) Filed: Jan. 28, 2019

(51) Int. Cl.
*G06N 3/08* (2006.01)
*G06K 9/00* (2006.01)
(Continued)

(52) U.S. Cl.
CPC .......... *G06N 3/08* (2013.01); *G06K 9/00362* (2013.01); *G06K 9/6256* (2013.01); *G06N 7/00* (2013.01);
(Continued)

(58) Field of Classification Search
CPC .... G06N 3/08; G06N 7/00; G06T 7/11; G06T 2207/30196; G06T 2207/20081; G06K 9/6256; G06K 9/00362
See application file for complete search history.

(56) References Cited

U.S. PATENT DOCUMENTS

| 2013/0249908 A1* | 9/2013 | Black | G06T 17/00 345/420 |
| 2018/0121762 A1* | 5/2018 | Han | G06K 9/4604 |

(Continued)

*Primary Examiner* — Kamran Afshar
*Assistant Examiner* — Imad Kassim
(74) *Attorney, Agent, or Firm* — Xsensus LLP

(57) ABSTRACT

A method for learning a pedestrian detector to be used for robust surveillance or military purposes based on image analysis is provided for a solution to a lack of labeled images and for a reduction of annotation costs. The method can be also performed by using generative adversarial networks (GANs). The method includes steps of: a learning device generating an image patch by cropping each of regions on a training image, and instructing an adversarial style transformer to generate a transformed image patch by converting each of pedestrians into transformed pedestrians capable of impeding a detection; and generating a transformed training image by replacing each of the regions with the transformed image patch, instructing the pedestrian detector to detecting the transformed pedestrians, and learning parameters of the pedestrian detector to minimize losses. This learning, as a self-evolving system, is robust to adversarial patterns by generating training data including hard examples.

24 Claims, 8 Drawing Sheets

(51) Int. Cl.
  *G06K 9/62* (2006.01)
  *G06N 7/00* (2006.01)
  *G06T 7/11* (2017.01)
(52) U.S. Cl.
  CPC ...... *G06T 7/11* (2017.01); *G06T 2207/20081* (2013.01); *G06T 2207/30196* (2013.01)

(56) References Cited

U.S. PATENT DOCUMENTS

| | | | |
|---|---|---|---|
| 2018/0300556 A1* | 10/2018 | Varerkar | G06K 9/00771 |
| 2018/0322640 A1* | 11/2018 | Kim | G08G 1/04 |
| 2018/0374233 A1* | 12/2018 | Zhou | G06T 7/70 |
| 2019/0019042 A1* | 1/2019 | Tanigawa | G06K 9/627 |
| 2019/0130215 A1* | 5/2019 | Kaestle | G06K 9/00771 |
| 2019/0147234 A1* | 5/2019 | Kicanaoglu | G06K 9/00342 |
| 2019/0147320 A1* | 5/2019 | Mattyus | G06N 3/0454 |
| | | | 382/155 |

* cited by examiner ized from a learning device, from the input image, and the learning device...

LEARNING METHOD AND LEARNING DEVICE OF PEDESTRIAN DETECTOR FOR ROBUST SURVEILLANCE BASED ON IMAGE ANALYSIS BY USING GAN AND TESTING METHOD AND TESTING DEVICE USING THE SAME

FIELD OF THE DISCLOSURE

The present disclosure relates to a learning method and a learning device, a testing method and a testing device for use with an autonomous vehicle; and more particularly, to the learning method and the learning device for learning a pedestrian detector to be used for robust surveillance based on image analysis by using GAN, and the testing method and the testing device using the same.

BACKGROUND OF THE DISCLOSURE

In machine learning, a convolutional neural network (CNN, or ConvNet) is a class of deep, feed-forward artificial neural network that has successfully been applied to analyzing visual imagery.

A CNN-based object detector may (i) instruct one or more convolutional layers to apply convolution operations to an input image, to thereby generate a feature map corresponding to the input image, (ii) instruct an RPN (Region Proposal Network) to generate proposals corresponding to an object in the input image by using the feature map, (iii) instruct a pooling layer to apply at least one pooling operation to areas on the feature map corresponding to the proposals, to thereby generate one or more pooled feature maps, and (iv) instruct an FC (Fully Connected) layer to apply at least one fully connected operation to the acquired pooled feature maps to output class information and regression information for the object, to thereby detect the object on the input image.

Recently, a conventional surveillance system using such an object detector has been developed. The conventional surveillance system uses a conventional pedestrian detector specialized for detecting an object, i.e., a pedestrian, from an image inputted from a surveillance camera, and detects the pedestrian by referring to a hair style, texture pattern and shape of clothes.

However, in the conventional pedestrian detector, there is a problem that the pedestrian cannot be detected accurately in case that the pedestrian is in a unique style and/or pattern which is not found in training data, or in case that the pedestrian is wearing something similar to the surroundings, like wearing a black dress on a dark road. If the pedestrian attempts to exploit such vulnerabilities and tries to hide or conceal his/her presence, the surveillance system will have serious problems.

Therefore, in case the conventional pedestrian detector fails to detect the pedestrian, a monitoring personnel must add training data of the failed case to enhance the coverage of the training data, and periodically retrain the pedestrian detector.

However, periodic retraining of the pedestrian detector does not prevent the failed cases from happening, and there is a disadvantage that the retraining must be performed in order to compensate for every failed case, and that a separate manpower is required for monitoring whether there is any undetected objects.

Furthermore, it is also difficult to secure adeaquate training data to perform the retraining for the failed cases.

SUMMARY OF THE DISCLOSURE

It is an object of the present disclosure to solve all the aforementioned problems.

It is another object of the present disclosure to expand coverage of training data.

It is still another object of the present disclosure to reduce extra personnel for monitoring non-detection cases.

It is still yet another object of the present disclosure to improve a performance of a surveillance system by adequate training of the non-detection cases.

In accordance with one aspect of the present disclosure, there is provided a method for learning a pedestrian detector to be used for robust surveillance based on image analysis, including steps of: (a) a learning device, if at least one training image with each of bounding boxes corresponding to each of pedestrians for training generated thereon is acquired, generating one or more image patches by cropping each of regions, corresponding to each of the bounding boxes, on the training image, and instructing an adversarial style transformer to generate one or more transformed image patches by converting each of the pedestrians for training corresponding to each of the image patches into each of transformed pedestrians capable of impeding a detection by the pedestrian detector; and (b) the learning device generating at least one transformed training image by replacing each of the regions, corresponding to each of the bounding boxes, on the training image with the transformed image patches, instructing the pedestrian detector to generate pedestrian detection information for training by detecting the transformed pedestrians located in the transformed training image, instructing a first loss layer to calculate one or more first losses by referring to each piece of the pedestrian detection information for training and its corresponding GT, and learning at least part of one or more parameters of the pedestrian detector to minimize the first losses.

As one example, at the step of (b), the learning device instructs a discriminator to generate each of pedestrian scores for training representing each of probabilities of each of the transformed image patches being each of the pedestrians for training, and to further learn at least part of one or more parameters of the adversarial style transformer to maximize the pedestrian scores for training and the first losses.

As one example, the discriminator is an image classifier which includes either (i) one or more convolutional layers and at least one fully connected layer, or (ii) a fully convolutional network.

As one example, at the step of (b), the learning device instructs a second loss layer to calculate one or more second losses by referring to each of the pedestrian scores for training and its corresponding GT, and to learn at least part of one or more parameters of the discriminator to minimize the second losses.

As one example, the adversarial style transformer includes an encoder having one or more convolutional layers for applying one or more convolution operations to the image patches, and a decoder having one or more deconvolutional layers for applying one or more deconvolution operations to at least one feature map outputted from the encoder.

As one example, at the step of (a), the learning device resizes at least one of the image patches such that the image patches have a same size, and instructs the adversarial style transformer to output the transformed image patches with the same size, and, at the step of (b), the learning device resizes the transformed image patches with the same size such that each of the transformed image patches has its own corresponding original size before the transformation, and then generates the transformed training image.

As one example, the training image is acquired from one of (i) the pedestrian detector outputting pedestrian detection information for testing including the bounding boxes by detecting pedestrians for testing located in at least one test image acquired from a surveillance camera, and (ii) a database storing the training image with its own true labels corresponding to the bounding boxes.

In accordance with another aspect of the present disclosure, there is provided a testing method for a pedestrian detector for testing to be used for robust surveillance based on image analysis, including steps of: (a) a testing device, on condition that (1) a learning device has generated one or more image patches for training by cropping each of regions for training, corresponding to each of the bounding boxes for training, on at least one training image, which includes each of the bounding boxes for training corresponding to each of pedestrians for training generated thereon, and has instructed an adversarial style transformer to generate one or more transformed image patches for training by converting each of the pedestrians for training corresponding to each of the image patches for training into each of transformed pedestrians for training capable of impeding a detection for training by the pedestrian detector, and (2) the learning device has been generated at least one transformed training image by replacing each of the regions for training, corresponding to each of the bounding boxes for training, on the training image with the transformed image patches for training, has instructed the pedestrian detector to generate pedestrian detection information for training by detecting the transformed pedestrians for training located in the transformed training image, has instructed a first loss layer to calculate one or more first losses by referring to each piece of the pedestrian detection information for training and its corresponding GT, and has learned at least part of one or more parameters of the pedestrian detector to minimize the first losses; if at least one test image with each of bounding boxes for testing corresponding to each of pedestrians for testing generated thereon is acquired, generating one or more image patches for testing by cropping each of regions for testing, corresponding to each of the bounding boxes for testing, on the test image, and instructing an adversarial style transformer to generate one or more transformed image patches for testing by converting each of the pedestrians for testing corresponding to each of the image patches for testing into each of transformed pedestrians for testing capable of impeding a detection for testing by the pedestrian detector; and (b) the testing device generating at least one transformed test image by replacing each of the regions for testing, corresponding to each of the bounding boxes for testing, on the test image with the transformed image patches for testing, and instructing the pedestrian detector to generate pedestrian detection information for testing by detecting the transformed pedestrians for testing located in the transformed test image.

As one example, at the step of (b), the testing device instructs a discriminator to generate each of pedestrian scores for testing representing each of probabilities of each of the transformed image patches for testing being each of the pedestrians for testing.

As one example, the discriminator is an image classifier which includes either (i) one or more convolutional layers and at least one fully connected layer, or (ii) a fully convolutional network.

As one example, at the process of (II), the learning device has instructed a second loss layer to calculate one or more second losses by referring to each of the pedestrian scores for training and its corresponding GT, and to learn at least part of one or more parameters of the discriminator to minimize the second losses.

As one example, the adversarial style transformer includes an encoder having one or more convolutional layers for applying one or more convolution operations to the image patches for testing, and a decoder having one or more deconvolutional layers for applying one or more deconvolution operations to at least one feature map for testing outputted from the encoder.

As one example, at the step of (a), the testing device resizes at least one of the image patches for testing such that the image patches for testing have a same size, and instructs the adversarial style transformer to output the transformed image patches for testing with the same size, and, at the step of (b), the testing device resizes the transformed image patches for testing with the same size such that each of the transformed image patches for testing has its own corresponding original size before the transformation, and then generates the transformed test image.

As one example, the training image has been acquired from one of (i) the pedestrian detector outputting the pedestrian detection information for testing including the bounding boxes for testing by detecting the pedestrians for testing located in the test image acquired from a surveillance camera, and (ii) a database storing the training image with its own true labels corresponding to the bounding boxes for training.

In accordance with still another aspect of the present disclosure, there is provided a learning device for learning a pedestrian detector to be used for robust surveillance based on image analysis, including: at least one memory that stores instructions; and at least one processor configured to execute the instructions to: perform processes of: (I) if at least one training image with each of bounding boxes corresponding to each of pedestrians for training generated thereon is acquired, generating one or more image patches by cropping each of regions, corresponding to each of the bounding boxes, on the training image, and instructing an adversarial style transformer to generate one or more transformed image patches by converting each of the pedestrians for training corresponding to each of the image patches into each of transformed pedestrians capable of impeding a detection by the pedestrian detector, and (II) generating at least one transformed training image by replacing each of the regions, corresponding to each of the bounding boxes, on the training image with the transformed image patches, instructing the pedestrian detector to generate pedestrian detection information for training by detecting the transformed pedestrians located in the transformed training image, instructing a first loss layer to calculate one or more first losses by referring to each piece of the pedestrian detection information for training and its corresponding GT, and learning at least part of one or more parameters of the pedestrian detector to minimize the first losses.

As one example, at the process of (II), the processor instructs a discriminator to generate each of pedestrian scores for training representing each of probabilities of each of the transformed image patches being each of the pedestrians for training, and to further learn at least part of one or more parameters of the adversarial style transformer to maximize the pedestrian scores for training and the first losses.

As one example, the discriminator is an image classifier which includes either (i) one or more convolutional layers and at least one fully connected layer, or (ii) a fully convolutional network.

As one example, at the process of (II), the processor instructs a second loss layer to calculate one or more second losses by referring to each of the pedestrian scores for training and its corresponding GT, and to learn at least part of one or more parameters of the discriminator to minimize the second losses.

As one example, the adversarial style transformer includes an encoder having one or more convolutional layers for applying one or more convolution operations to the image patches, and a decoder having one or more deconvolutional layers for applying one or more deconvolution operations to at least one feature map outputted from the encoder.

As one example, at the process of (I), the processor resizes at least one of the image patches such that the image patches have a same size, and instructs the adversarial style transformer to output the transformed image patches with the same size, and, at the process of (II), the processor resizes the transformed image patches with the same size such that each of the transformed image patches has its own corresponding original size before the transformation, and then generates the transformed training image.

As one example, the training image is acquired from one of (i) the pedestrian detector outputting pedestrian detection information for testing including the bounding boxes by detecting pedestrians for testing located in at least one test image acquired from a surveillance camera, and (ii) a database storing the training image with its own true labels corresponding to the bounding boxes.

In accordance with still yet another aspect of the present disclosure, there is provided a testing device for a pedestrian detector for testing to be used for robust surveillance based on image analysis, including: at least one memory that stores instructions; and at least one processor, on condition that (1) a learning device has generated one or more image patches for training by cropping each of regions for training, corresponding to each of the bounding boxes for training, on at least one training image, which includes each of the bounding boxes for training corresponding to each of pedestrians for training generated thereon, and has instructed an adversarial style transformer to generate one or more transformed image patches for training by converting each of the pedestrians for training corresponding to each of the image patches for training into each of transformed pedestrians for training capable of impeding a detection for training by the pedestrian detector, and (2) the learning device has generated at least one transformed training image by replacing each of the regions for training, corresponding to each of the bounding boxes for training, on the training image with the transformed image patches for training, has instructed the pedestrian detector to generate pedestrian detection information for training by detecting the transformed pedestrians for training located in the transformed training image, has instructed a first loss layer to calculate one or more first losses by referring to each piece of the pedestrian detection information for training and its corresponding GT, and has learned at least part of one or more parameters of the pedestrian detector to minimize the first losses; configured to execute the instructions to: perform processes of: (I) if at least one test image with each of bounding boxes for testing corresponding to each of pedestrians for testing generated thereon is acquired, generating one or more image patches for testing by cropping each of regions for testing, corresponding to each of the bounding boxes for testing, on the test image, and instructing an adversarial style transformer to generate one or more transformed image patches for testing by converting each of the pedestrians for testing corresponding to each of the image patches for testing into each of transformed pedestrians for testing capable of impeding a detection for testing by the pedestrian detector, and (II) generating at least one transformed test image by replacing each of the regions for testing, corresponding to each of the bounding boxes for testing, on the test image with the transformed image patches for testing, and instructing the pedestrian detector to generate pedestrian detection information for testing by detecting the transformed pedestrians for testing located in the transformed test image.

As one example, at the process of (II), the processor instructs a discriminator to generate each of pedestrian scores for testing representing each of probabilities of each of the transformed image patches for testing being each of the pedestrians for testing.

As one example, the discriminator is an image classifier which includes either (i) one or more convolutional layers and at least one fully connected layer, or (ii) a fully convolutional network.

As one example, at the process of (2), the learning device has instructed a second loss layer to calculate one or more second losses by referring to each of the pedestrian scores for training and its corresponding GT, and to learn at least part of one or more parameters of the discriminator to minimize the second losses.

As one example, the adversarial style transformer includes an encoder having one or more convolutional layers for applying one or more convolution operations to the image patches for testing, and a decoder having one or more deconvolutional layers for applying one or more deconvolution operations to at least one feature map for testing outputted from the encoder.

As one example, at the process of (I), the processor resizes at least one of the image patches for testing such that the image patches for testing have a same size, and instructs the adversarial style transformer to output the transformed image patches for testing with the same size, and, at the process of (II), the processor resizes the transformed image patches for testing with the same size such that each of the transformed image patches for testing has its own corresponding original size before the transformation, and then generates the transformed test image.

As one example, the training image has been acquired from one of (i) the pedestrian detector outputting the pedestrian detection information for testing including the bounding boxes for testing by detecting the pedestrians for testing located in the test image acquired from a surveillance camera, and (ii) a database storing the training image with its own true labels corresponding to the bounding boxes for training.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION

Figure 1:
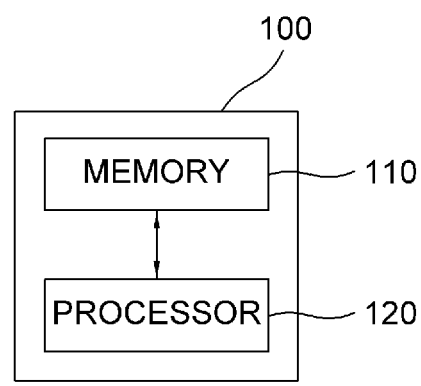
FIG. 1 is a drawing schematically illustrating a learning device for learning a pedestrian detector to be used for robust surveillance based on image analysis in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to carry out the present disclosure easily, the example embodiments of the present disclosure by referring to attached diagrams will be explained in detail as shown below.

FIG. 1 is a drawing schematically illustrating a learning device for learning a pedestrian detector to be used for robust surveillance based on image analysis in accordance with one example embodiment of the present disclosure. By referring to FIG. 1, the learning device 100 may include a memory 110 for storing instructions to learn the pedestrian detector, and a processor 120 for performing processes corresponding to the instructions in the memory 110 to learn the pedestrian detector.

Specifically, the learning device 100 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

Such description of the computing device does not exclude an integrated device including any combination of a processor, a memory, a medium, or any other computing components for implementing the present disclosure.

A method for learning the pedestrian detector to be used for a robust surveillance based on image analysis by using the learning device 100 in accordance with one example embodiment of the present disclosure is described by referring to FIG. 2 as follows.

For reference, in the description below, the phrase "for training" or "training" is added for terms related to the learning process, and the phrase "for testing" or "testing" is added for terms related to the testing process, to avoid possible confusion.

First, if at least one training image I 11 with each of bounding boxes $R^{-1}(x)$ corresponding to each of pedestrians for training generated thereon is acquired, the learning device 100 may generate one or more image patches x 12 by cropping each of regions, corresponding to each of the bounding boxes $R^{-1}(x)$, on the training image I 11, at a step of S1. I may correspond to any one of training images used for learning, and x may correspond to any one of the bounding boxes on each of the training images.

Herein, the learning device 100 may resize at least one of the image patches x 12 such that the image patches x 12 have a same size. Also, in order for the image patches x to have the same size, the learning device 100 may enlarge part of the image patches x, may shrink part of the image patches x, or may leave sizes of part of the image patches x as is.

Figure 3:
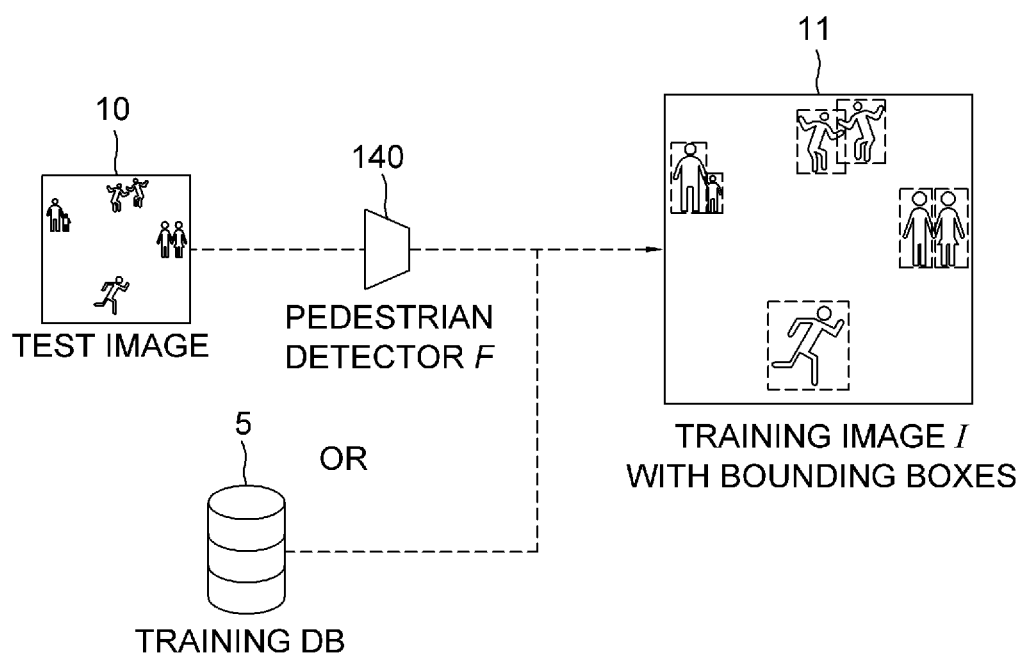
FIG. 3 is a drawing schematically illustrating a process of acquiring at least one training image in a learning method for learning the pedestrian detector to be used for robust surveillance based on image analysis in accordance with one example embodiment of the present disclosure.

Meanwhile, by referring to FIG. 3, the learning device 100 may acquire the training image I 11 from one of (i) the pedestrian detector 140 capable of outputting pedestrian detection information for testing including the bounding boxes by detecting pedestrians for testing located in at least one test image 10 acquired from a surveillance camera, and (ii) a training database 5 storing the training image with its own true labels corresponding to the bounding boxes.

As one example, by referring to FIG. 3, a method for acquiring the training image I 11 from the pedestrian detector 140 is described as follows.

If the test image I 10 acquired from the surveillance camera is inputted, the pedestrian detector 140 may instruct one or more convolutional layers 141 to apply one or more convolution operations to the test image I 10, to thereby generate at least one feature map for testing. Herein, the convolutional layers 141 may generate the feature map for testing by sequentially applying the convolution operations to the test image I 10.

Then the pedestrian detector 140 may instruct at least one RPN (Region Proposal Network) 142 to generate proposal boxes for testing corresponding to candidate regions, estimated as including at least one pedestrian, on the feature map for testing.

Thereafter, the pedestrian detector 140 may instruct at least one pooling layer 143 to generate one or more feature vectors for testing by applying one or more pooling operations to regions, corresponding to the proposal boxes for testing, on the feature map for testing.

And the pedestrian detector 140 may instruct at least one FC (fully connected) layer 144 to apply at least one fully-connected operation to the feature vectors for testing, may instruct at least one classification layer 145 to output each piece of pedestrian class information for testing corresponding to each of the proposal boxes for testing, and may instruct at least one regression layer 146 to generate the bounding boxes for testing resulting from each of the proposal boxes for testing bounding each of pedestrians for testing.

Meanwhile, the pedestrian detector 140 may have been learned beforehand. That is, at least part of one or more parameters of the FC layer 144 and the convolutional layers 141 may have been adjusted by backpropagating one or more losses. Also, the RPN 142 may have been learned beforehand.

By referring to FIG. 2 again, the learning device 100 may instruct an adversarial style transformer G 130 to generate each of one or more transformed image patches G(x) 13 by converting each of the pedestrians for training corresponding to each of the image patches x 12 into each of transformed pedestrians capable of impeding a detection by the pedestrian detector 140, at a step of S2.

Herein, the adversarial style transformer G 130 may include an encoder having one or more convolutional layers for applying one or more convolution operations to the image patches x 12, and a decoder having one or more deconvolutional layers for applying one or more deconvolution operations to at least one feature map outputted from the encoder and generating the transformed image patches G(x) 13.

Meanwhile, the adversarial style transformer G 130 may generate the transformed image patches G(x) 13 by converting the image patches x 12 so as to correspond to the surroundings or by converting each of the image patches x 12 corresponding to each of the pedestrians that are detected by the pedestrian detector 140 or that are easy to detect in the training image I 11 retrieved from the training database, such that each of the image patches x 12 has a unique style and/or pattern difficult to detect by the pedestrian detector 140, that is, not found in conventional training data.

Next, the learning device 100 may generate at least one transformed training image 14 having each of regions $R^{-1}(G(x))$ where each of the transformed pedestrians is located, by replacing each of regions, corresponding to each of the bounding boxes $R^{-1}(x)$, on the training image I 11 with the transformed image patches G(x), at a step of S3.

Herein, if the learning device 100 resized at least one of the image patches x 12 above, the learning device 100 may resize its corresponding transformed image patch G(x) such that the transformed image patch has its own corresponding original size before the transformation, and then may generate the transformed training image 14.

And the transformed training image 14 may be represented as follows.

$$I_G = I + \sum_x (R^{-1}(G(x)) - R^{-1}(x))$$

Then, the learning device 100 may instruct the pedestrian detector 140 to detect the transformed pedestrians $R^{-1}G((x))$ located in the transformed training image 14, to thereby generate pedestrian detection information for training.

Figure 4:
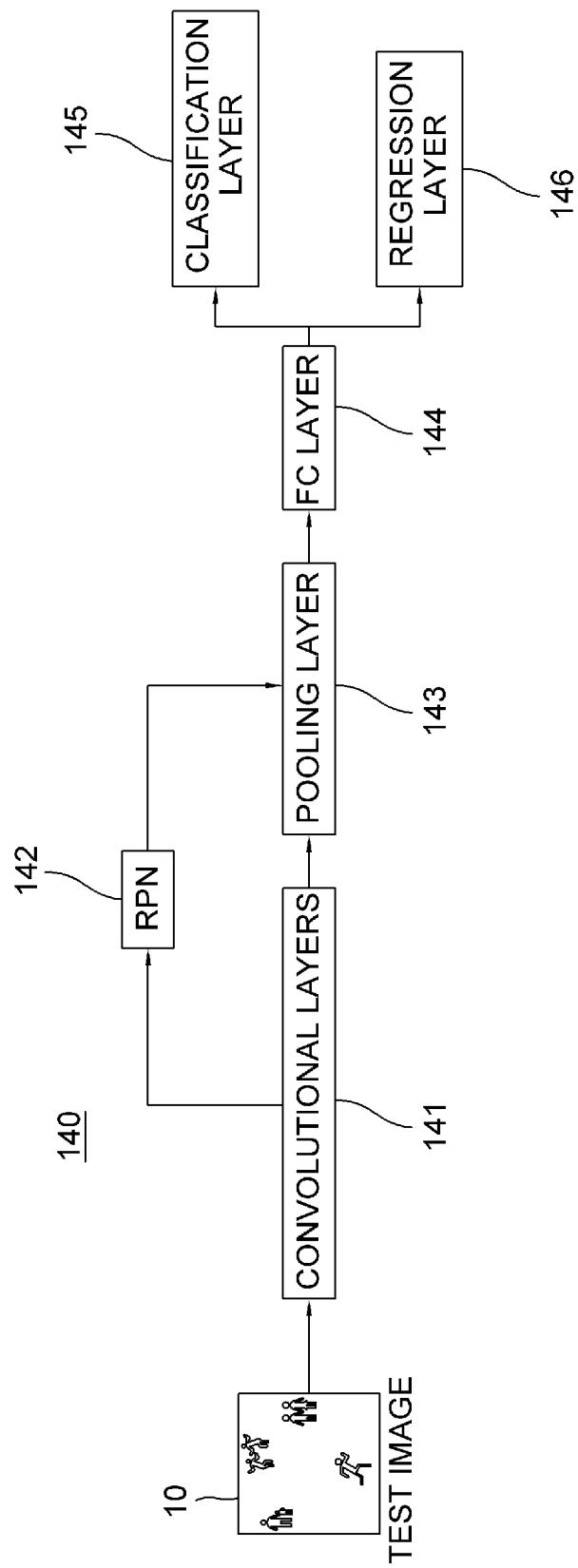
FIG. 4 is a drawing schematically illustrating the pedestrian detector to be used for robust surveillance based on image analysis in accordance with one example embodiment of the present disclosure.

As one example, by referring to FIG. 4, a method for detecting the transformed pedestrians in the transformed training image 14 by the pedestrian detector 140 is described as follows.

If the transformed training image 14 is inputted, the pedestrian detector 140 may instruct the convolutional layers 141 to apply the convolution operations to the transformed training image 14, to thereby generate at least one feature map for training. Herein, the convolutional layers 141 may generate the feature map for training by sequentially applying the convolution operations to the transformed training image 14.

Then the pedestrian detector 140 may instruct the RPN (Region Proposal Network) 142 to generate proposal boxes for training corresponding to candidate regions, estimated as including the transformed pedestrians $R^{-1}G((x))$, on the feature map for training.

Thereafter, the pedestrian detector 140 may instruct the pooling layer 143 to generate one or more feature vectors for training by applying the pooling operations to regions, corresponding to the proposal boxes for training, on the feature map for training.

And the pedestrian detector 140 may instruct the FC (fully connected) layer 144 to apply the fully-connected operation to the feature vectors for training, may instruct the classification layer 145 to output each piece of pedestrian class information for training corresponding to each of the proposal boxes for training, and may instruct the regression layer 146 to generate the bounding boxes for training resulting from each of the proposal boxes for training bounding each of the transformed pedestrians.

Then, the learning device 100 may instruct the first loss layer 160 to calculate one or more first losses by referring to each piece of the pedestrian detection information for training and its corresponding GT, and to learn at least part of one or more parameters of the pedestrian detector 140 to minimize the first losses, at a step of S4.

Herein, an optimizing formula for the pedestrian detector F 140 may be represented as follows.

$$F^* = \underset{F}{\mathrm{argmin}} \sum_{I_G} L(F(I_G))$$

Therefore, an updating formula for each of weights of the pedestrian detector F 140 may be represented as follows.

$$w'_F = w_F - \eta \frac{dL(F(I_G))}{dw_F}$$

Meanwhile, the learning device 100 may instruct a discriminator 150 to generate each of pedestrian scores $D(G(x))$ for training representing each of probabilities of each of the transformed image patches $G(x)$ 13 being each of the pedestrians for training, and to further learn at least part of one or more parameters of the adversarial style transformer 130 to maximize the pedestrian scores for training and the first losses, at steps of S5 and S6.

Herein, a purpose of learning at least part of the parameters of the adversarial style transformer 130 to maximize the first losses is to make the transformed image patches $G(x)$ 13 more difficult for the pedestrian detector 140 to detect when the adversarial style transformer 130 converts the image patches x 12 into the transformed image patches $G(x)$ 13. Herein, a purpose of learning at least part of the parameters of the adversarial style transformer 130 to maximize the pedestrian scores for training is to make the transformed image patches $G(x)$ maintain its pedestrian class so that the transformed image patches $G(x)$ look realistic, although the adversarial style transformer 130 converts the image patches x 12 into the transformed image patches $G(x)$ 13 that are difficult for the pedestrian detector 140 to detect.

Figure 5:
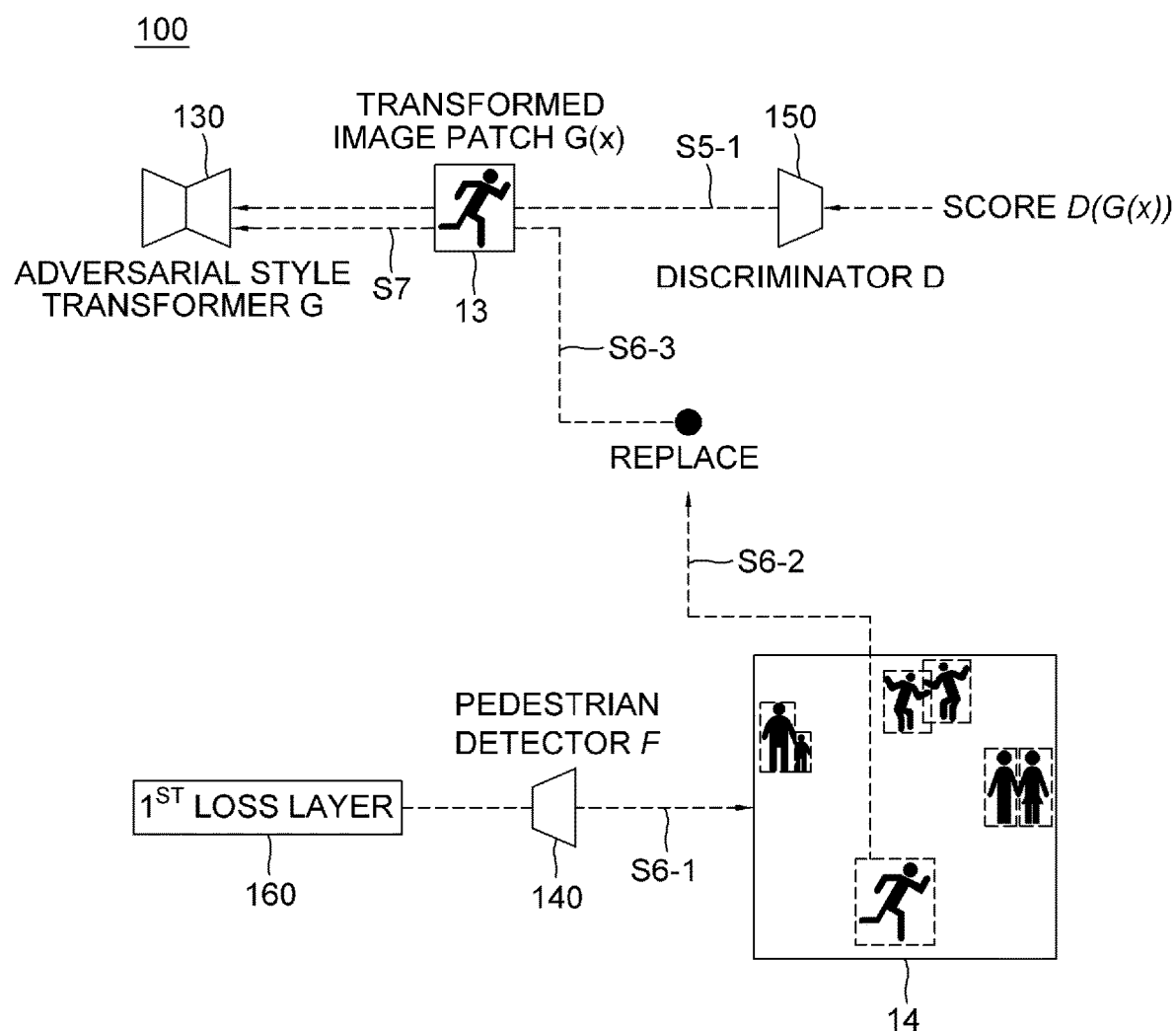
FIG. 5 is a drawing schematically illustrating a process of learning an adversarial style transformer in a learning method for learning the pedestrian detector to be used for robust surveillance based on image analysis in accordance with one example embodiment of the present disclosure.

And, by referring to FIG. 5, a method for learning the adversarial style transformer 130 is described as follows.

The learning device 100 may perform differentiation of the transformed training image 14 outputted from the pedestrian detector F 140 by backpropagation for maximizing the first losses $L(F(I_G))$, at a step of S6-1. Herein, the differentiation of the transformed training image 14 may be represented as follows.

$$\frac{dL}{d(I + \ldots)} = \frac{dL}{dF} \frac{dF}{d(I + \ldots)}$$

Then, the learning device 100 may perform differentiation of each of the transformed pedestrians $R^{-1}G((x))$ in the transformed training image 14, at a step of S6-2. Herein, the differentiation of the each of the transformed pedestrians $R^{-1}G((x))$ may be represented as follows.

$$\frac{dL}{dR^{-1}(G(x))} = \frac{dL}{dF} \frac{dF}{dR^{-1}(G(x))}$$

Then, the learning device 100 may perform differentiation of the transformed image patches $G(x)$ by referring to the differentiation of the transformed pedestrians $R^{-1}G((x))$, at a step of S6-3. Herein, the differentiation of the transformed image patches $G(x)$ may be represented as follows.

$$\frac{dL}{dG(x)} = \frac{dL}{dF} \frac{dF}{dR^{-1}} \frac{dR^{-1}}{dG(x)}$$

Then the learning device 100 may perform differentiation of the transformed image patches $G(x)$ outputted from the discriminator D 150 by backpropagation for maximizing the pedestrian scores $D(G(x))$ for training, at a step of S5-1. Herein, the differentiation of the transformed image patches $G(x)$ may be represented as follows.

$$\frac{d\log D}{dG(x)} = \frac{1}{D} \frac{dD}{dG(x)}$$

Then, the learning device 100 may calculate at least one gradient of the adversarial style transformer G 130 by backpropagation, at a step of S7. And the gradient of the adversarial style transformer G 130 by backpropagation may be represented as $$\frac{dG(x)}{dw_G}.$$

Herein, an optimizing formula for the adversarial style transformer G 130 may be represented as follows.

$$G^* = \underset{G}{\mathrm{argmax}} \sum_{I} \left( L\left( F^*\left( I + \sum_{x \in I} (R^{-1}(G(x)) - R^{-1}(x)) \right) \right) + \alpha \sum_{x \in I} \log D^*(G(x)) \right)$$

Therefore, to maximize the pedestrian scores $D(G(x))$ for training and the first losses $L(F(I_G))$, the updating formula for each of the weights of the adversarial style transformer G 130 may be represented by a following formula by referring to $$\frac{dL}{dG(x)} = \frac{dL}{dF} \frac{dF}{dR^{-1}} \frac{dR^{-1}}{dG(x)}$$

which is differentiation of the transformed image patches G(x) by backpropagation for maximizing the first losses L(F(I$_G$)), and $$\frac{d\log D}{dG(x)} = \frac{1}{D} \frac{dD}{dG(x)}$$

which is differentiation of the transformed image patches G(x) by backpropagation for maximizing the pedestrian scores for training D(G(x)).

$$w'_G = w_G + \eta \sum_x \left( \frac{dL}{dG(x)} + \alpha \frac{d\log D}{dG(x)} \right) \frac{dG(x)}{dw_G}$$

By referring to FIG. 2 again, the learning device 100 may instruct a second loss layer to calculate one or more second losses by referring to each of the pedestrian scores for training and its corresponding GT, and to learn at least part of one or more parameters of the discriminator 150 to minimize the second losses.

Herein, the discriminator 150 may be an image classifier for determining whether the objects located in the transformed image patches G(x) 13 are pedestrians. And, the image classifier may include either (i) one or more convolutional layers and at least one fully connected layer, or (ii) a fully convolutional network, but the scope of the present disclosure is not limited thereto, and any image classifier capable of recognizing objects in images based on deep learning may be used.

Figure 6:
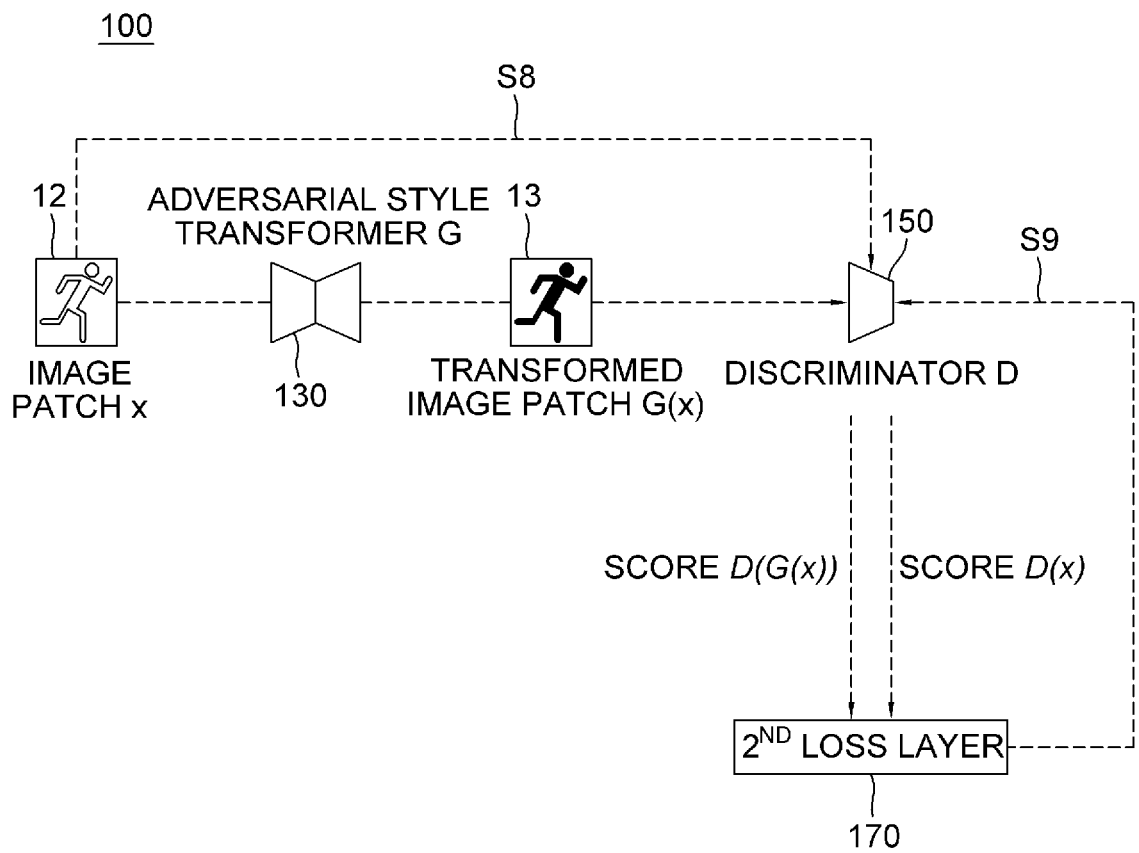
FIG. 6 is a drawing schematically illustrating a process of learning a discriminator in a learning method for learning the pedestrian detector to be used for robust surveillance based on image analysis in accordance with one example embodiment of the present disclosure.

And, by referring to FIG. 6, a method for learning the discriminator 150 is described as follows.

The learning device 100 may instruct the discriminator 150 to generate each of pedestrian scores D(G(x)) for training representing each of probabilities of each of the transformed image patches G(x) 13 being each of the pedestrians for training, and to generate each of pedestrian scores D(x) for GT representing each of probabilities of each of its corresponding image patch x 12 being each of the pedestrians for training.

Then, the learning device 100 may instruct the second loss layer 170 to calculate the second losses.

Herein, the second losses may be represented as log D(x)+log (1−D(G(x))), and accordingly, an optimizing formula for the discriminator D 150 may be represented as follows.

$$D^* = \underset{D}{\operatorname{argmax}} \sum_l \sum_{x \in l} (\log D(x) + \log(1 - D(G(x))))$$

Therefore, an updating formula for each of weights of the discriminator D 150 may be represented as follows.

$$w'_D = w_D + \eta \sum_x \frac{d}{dw_D} (\log D(x) + \log(1 - D(G(x))))$$

That is, the learning method in accordance with the present disclosure may be described briefly as follows, but the scope of the present disclosure is not limited thereto.

First, each bounding-box $R^{-1}$(x) for each of the pedestrians for training on the training image is acquired.

Then, G(x), D(x), D(G(x)), and $R^{-1}$(G(x)) are calculated for each $R^{-1}$(x), and $I_G = I + \Sigma_x (R^{-1}(G(X)) - R^{-1}(X))$ for the transformed training image 14 is generated.

Thereafter, the first losses L(F(I$_G$)) of the pedestrian detector are calculated, and each gradient is calculated by total backpropagation.

Then, the pedestrian detector 140, the discriminator 150, and the adversarial style transformer 130 are updated as formulas below.

$$w'_F = w_F - \eta \frac{dL(F(I_G))}{dw_F} \quad \text{(the pedestrian detector)}$$

$$w'_D = w_D + \quad \text{(the discriminator)}$$
$$\eta \sum_x \frac{d}{dw_D}(\log D(x) + \log(1 - D(G(x))))$$

$$w'_G = \quad \text{(the adversial style transformer)}$$
$$w_G + \eta \sum_x \left( \frac{dL}{dG(x)} + \alpha \frac{d\log D}{dG(x)} \right) \frac{dG(x)}{dw_G}$$

Figure 7:
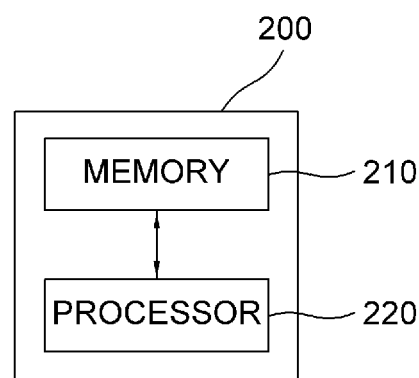
FIG. 7 is a drawing schematically illustrating a testing device for testing the pedestrian detector to be used for robust surveillance based on image analysis in accordance with one example embodiment of the present disclosure.

FIG. 7 is a drawing schematically illustrating a testing device for testing the pedestrian detector to be used for robust surveillance based on image analysis in accordance with one example embodiment of the present disclosure. By referring to FIG. 7, the testing device 200 may include a memory 210 for storing instructions to detect the pedestrians for testing by using the learned pedestrian detector, and a processor 220 for performing processes to detect the pedestrians for testing by using the learned pedestrian detector corresponding to the instructions in the memory 210.

Specifically, the testing device 200 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

Such description of the computing device does not exclude an integrated device including any combination of a processor, a memory, a medium, or any other computing components for implementing the present disclosure.

Figure 8:
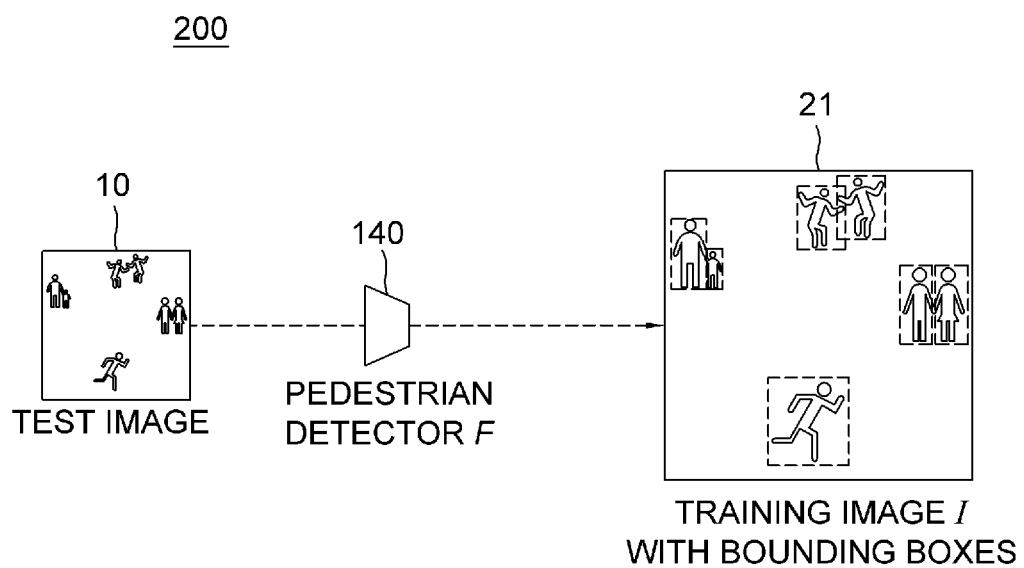
FIG. 8 is a drawing schematically illustrating a process of detecting at least one pedestrian by using the pedestrian detector to be used for robust surveillance based on image analysis in accordance with one example embodiment of the present disclosure.

A method for detecting the pedestrians for testing by using the testing device 200 in accordance with one example embodiment of the present disclosure is described by referring to FIG. 8 as follows.

Figure 2:
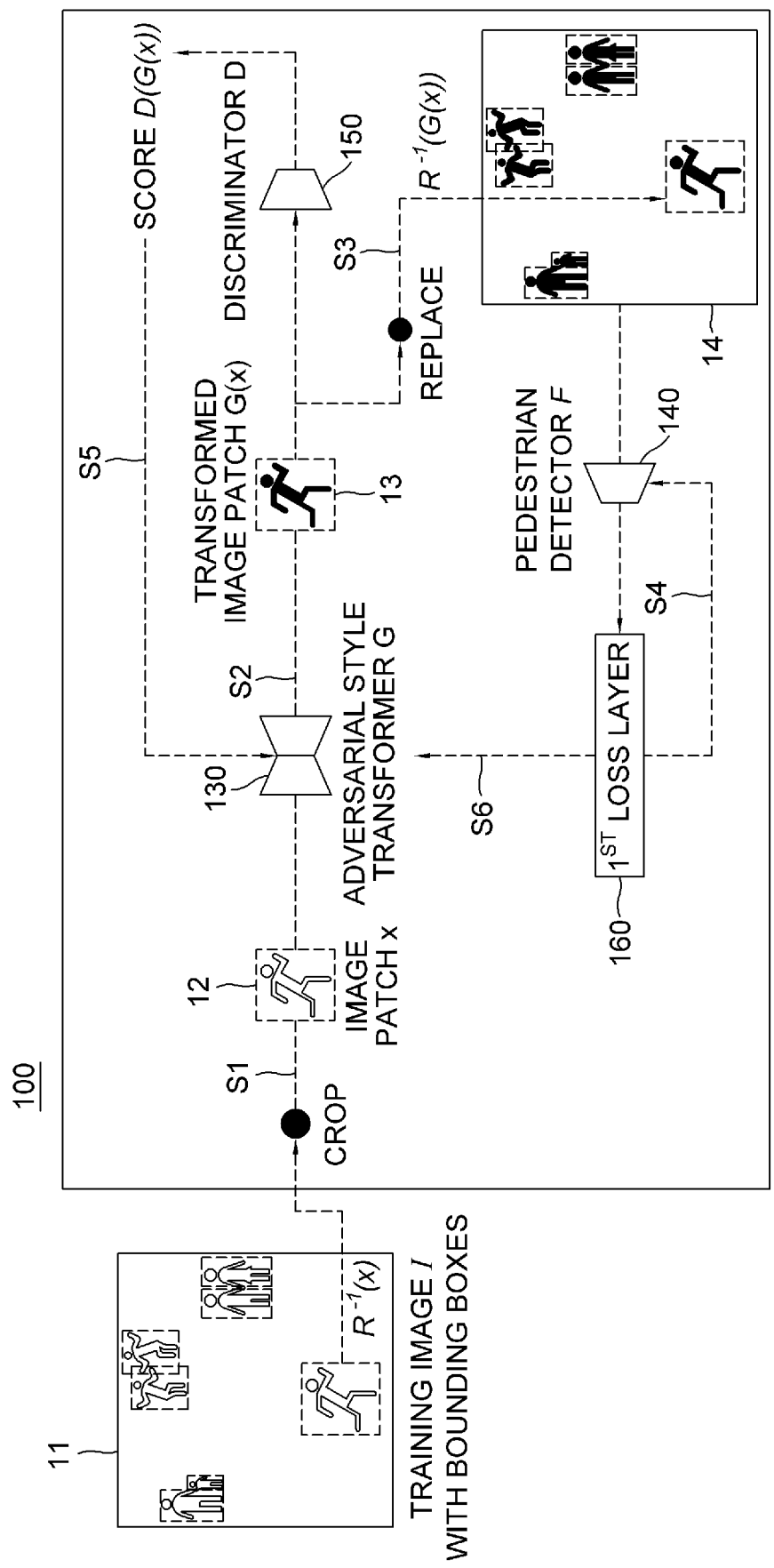
FIG. 2 is a drawing schematically illustrating a learning method for learning the pedestrian detector to be used for robust surveillance based on image analysis in accordance with one example embodiment of the present disclosure.

As described by referring to FIG. 2, on condition that the pedestrian detector 140 has been learned, if at least one test image 10 is acquired from the surveillance camera, the testing device 200 may instruct the pedestrian detector 140 to analyze the test image 10, to thereby detect the pedestrians for testing located in the test image 10, and generate pedestrian detection information 21 for testing corresponding to the pedestrians for testing.

Herein, by referring to FIG. 4 again, a method for detecting the pedestrians for testing in the test image 10 by the pedestrian detector 140 is described as follows.

If the test image 10 acquired from the surveillance camera is inputted, the pedestrian detector 140 may instruct the convolutional layers 141 to apply the convolution operations to the test image 10, to thereby generate the feature map for testing. Herein, the convolutional layers 141 may generate the feature map for testing by sequentially applying the convolution operations to the test image 10.

Then the pedestrian detector 140 may instruct the RPN (Region Proposal Network) 142 to generate proposal boxes for testing corresponding to candidate regions, estimated as including the pedestrians for testing, on the feature map for testing.

Thereafter, the pedestrian detector 140 may instruct the pooling layer 143 to generate one or more feature vectors for testing by applying the pooling operations to regions, corresponding to the proposal boxes for testing, on the feature map for testing.

And the pedestrian detector 140 may instruct the FC (fully connected) layer 144 to apply the fully connected operation to the feature vectors for testing, may instruct the classification layer 145 to output each piece of the pedestrian class information for testing corresponding to each of the proposal boxes for testing, and may instruct the regression layer 146 to generate the bounding boxes for testing resulting from each of the proposal boxes for testing bounding each of the pedestrians for testing.

Meanwhile, the learning device may have instructed the pedestrian detector 140 to complete processes of (a) if the training image with each of the bounding boxes corresponding to each of the pedestrians for training generated thereon is acquired, generating the image patches by cropping each of regions, corresponding to each of the bounding boxes, on the training image, and instructing the adversarial style transformer to generate the transformed image patches by converting each of the pedestrians for training corresponding to each of the image patches into each of transformed pedestrians capable of impeding a detection by the pedestrian detector; and (b) generating the transformed training image by replacing each of the regions, corresponding to each of the bounding boxes, on the training image with the transformed image patches, generating pedestrian detection information for training by detecting the transformed pedestrians located in the transformed training image, instructing the first loss layer to calculate the first losses by referring to each piece of the pedestrian detection information for training and its corresponding GT, and learning at least part of the parameters of the pedestrian detector to minimize the first losses.

Also, the learning device may have instructed the discriminator to complete processes of generating each of the pedestrian scores for training representing each of the probabilities of each of the transformed image patches being each of the pedestrians for training, and further learning at least part of the parameters of the adversarial style transformer to maximize the pedestrian scores for training and the first losses.

Also, the learning device 100 may have instructed the second loss layer to complete processes of calculating the second losses by referring to each of the pedestrian scores for training and its corresponding GT, and learning at least part of the parameters of the discriminator 150 to minimize the second losses.

The present disclosure has an effect of improving a detection rate of the pedestrian detector when cases similar to non-detection cases occur during testing of the pedestrian detector, by transforming an image whose pedestrian is easy to detect into an image whose pedestrian is difficult to detect, to thereby perform the learning of non-detection cases.

The present disclosure has another effect of generating various training data corresponding to the non-detection cases, to thereby secure adequate training data for cases of difficult detection.

The present disclosure has still another effect of minimizing possibilities of the non-detection cases by learning with the adequate training data for the cases of difficult detection, eliminating extra personnel for monitoring the non-detection cases, and minimizing maintenance cost of a surveillance system.

Further, the learning, as a self-evolving system, can be robust to adversarial patterns by generating training data including hard examples.

The method can be also used for a solution to a lack of labeled images and a reduction of annotation costs, and military purposes, not only for robust surveillance.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for learning a pedestrian detector to be used for robust surveillance based on image analysis, comprising steps of:
(a) a learning device, if at least one training image with each of bounding boxes corresponding to each of pedestrians for training generated thereon is acquired, generating one or more image patches by cropping each of regions, corresponding to each of the bounding boxes, on the training image, and instructing an adversarial style transformer to generate one or more transformed image patches by converting each of the pedestrians for training corresponding to each of the image patches into each of transformed pedestrians capable of impeding a detection by the pedestrian detector; and (b) the learning device generating at least one transformed training image by replacing each of the regions, corresponding to each of the bounding boxes, on the training image with the transformed image patches, and learning the pedestrian detector by using the transformed image patches in which the pedestrians are more difficult to detect by the pedestrian detector than the one or more image patches from the training image, wherein the step of learning the pedestrian detector includes (i) instructing the pedestrian detector to generate pedestrian detection information for training by detecting the transformed pedestrians located in the transformed training image, (ii) instructing a first loss layer to calculate one or more first losses by referring to each piece of the pedestrian detection information for training and its corresponding GT (Ground Truth), and (iii) learning at least part of one or more parameters of the pedestrian detector to minimize the first losses, wherein, at the step of (a), the learning device resizes at least one of the image patches such that the image patches have a same size, and instructs the adversarial style transformer to output the transformed image patches with the same size, and wherein, at the step of (b), the learning device resizes the transformed image patches with the same size such that each of the transformed image patches has its own corresponding original size before the transformation, and then generates the transformed training image.

2. The method of claim 1, wherein, at the step of (b), the learning device instructs a discriminator to generate each of pedestrian scores for training representing each of probabilities of each of the transformed image patches being each of the pedestrians for training, and to further learn at least part of one or more parameters of the adversarial style transformer to maximize the pedestrian scores for training and the first losses.

3. The method of claim 2, wherein the discriminator is an image classifier which includes either (i) one or more convolutional layers and at least one fully connected layer, or (ii) a fully convolutional network.

4. The method of claim 2, wherein, at the step of (b), the learning device instructs a second loss layer to calculate one or more second losses by referring to each of the pedestrian scores for training and its corresponding GT, and to learn at least part of one or more parameters of the discriminator to minimize the second losses.

5. The method of claim 1, wherein the adversarial style transformer includes an encoder having one or more convolutional layers for applying one or more convolution operations to the image patches, and a decoder having one or more deconvolutional layers for applying one or more deconvolution operations to at least one feature map outputted from the encoder.

6. The method of claim 1, wherein the training image is acquired from one of (i) the pedestrian detector outputting pedestrian detection information for testing including the bounding boxes by detecting pedestrians for testing located in at least one test image acquired from a surveillance camera, and (ii) a database storing the training image with its own true labels corresponding to the bounding boxes.

7. A testing method for a pedestrian detector for testing to be used for robust surveillance based on image analysis, comprising steps of:

(a) a testing device, on condition that (1) a learning device has generated one or more image patches for training by cropping each of regions for training, corresponding to each of the bounding boxes for training, on at least one training image, which includes each of the bounding boxes for training corresponding to each of pedestrians for training generated thereon, and has instructed an adversarial style transformer to generate one or more transformed image patches for training by converting each of the pedestrians for training corresponding to each of the image patches for training into each of transformed pedestrians for training capable of impeding a detection for training by the pedestrian detector, and (2) the learning device has been generated at least one transformed training image by replacing each of the regions for training, corresponding to each of the bounding boxes for training, on the training image with the transformed image patches for training, has instructed the pedestrian detector to generate pedestrian detection information for training by detecting the transformed pedestrians for training located in the transformed training image, has instructed a first loss layer to calculate one or more first losses by referring to each piece of the pedestrian detection information for training and its corresponding GT (Ground Truth), and has learned at least part of one or more parameters of the pedestrian detector to minimize the first losses; if at least one test image with each of bounding boxes for testing corresponding to each of pedestrians for testing generated thereon is acquired, generating one or more image patches for testing by cropping each of regions for testing, corresponding to each of the bounding boxes for testing, on the test image, and instructing an adversarial style transformer to generate one or more transformed image patches for testing by converting each of the pedestrians for testing corresponding to each of the image patches for testing into each of transformed pedestrians for testing capable of impeding a detection for testing by the pedestrian detector; and (b) the testing device generating at least one transformed test image by replacing each of the regions for testing, corresponding to each of the bounding boxes for testing, on the test image with the transformed image patches for testing, and learning the pedestrian detector by using the transformed image patches in which the pedestrians are more difficult to detect by the pedestrian detector than the one or more image patches from the training image, wherein the learning the pedestrian detector includes instructing the pedestrian detector to generate pedestrian detection information for testing by detecting the transformed pedestrians for testing located in the transformed test image;

wherein, at the step of (a), the learning device resizes at least one of the image patches such that the image patches have a same size, and instructs the adversarial style transformer to output the transformed image patches with the same size, and wherein, at the step of (b), the learning device resizes the transformed image patches with the same size such that each of the transformed image patches has its own corresponding original size before the transformation, and then generates the transformed training image.

8. The testing method of claim 7, wherein, at the step of (b), the testing device instructs a discriminator to generate each of pedestrian scores for testing representing each of probabilities of each of the transformed image patches for testing being each of the pedestrians for testing.

9. The testing method of claim 8, wherein the discriminator is an image classifier which includes either (i) one or more convolutional layers and at least one fully connected layer, or (ii) a fully convolutional network.

10. The testing method of claim 8, wherein, at the process of (2), the learning device has instructed a second loss layer to calculate one or more second losses by referring to each of the pedestrian scores for training and its corresponding GT, and to learn at least part of one or more parameters of the discriminator to minimize the second losses.

11. The testing method of claim 7, wherein the adversarial style transformer includes an encoder having one or more convolutional layers for applying one or more convolution operations to the image patches for testing, and a decoder having one or more deconvolutional layers for applying one or more deconvolution operations to at least one feature map for testing outputted from the encoder.

12. The testing method of claim 7, wherein the training image has been acquired from one of (i) the pedestrian detector outputting the pedestrian detection information for testing including the bounding boxes for testing by detecting the pedestrians for testing located in the test image acquired from a surveillance camera, and (ii) a database storing the training image with its own true labels corresponding to the bounding boxes for training.

13. A learning device for learning a pedestrian detector to be used for robust surveillance based on image analysis, comprising:
at least one memory that stores instructions; and
at least one processor configured to execute the instructions to: perform processes of: (I) if at least one training image with each of bounding boxes corresponding to each of pedestrians for training generated thereon is acquired, generating one or more image patches by cropping each of regions, corresponding to each of the bounding boxes, on the training image, and instructing an adversarial style transformer to generate one or more transformed image patches by converting each of the pedestrians for training corresponding to each of the image patches into each of transformed pedestrians capable of impeding a detection by the pedestrian detector, and (II) generating at least one transformed training image by replacing each of the regions, corresponding to each of the bounding boxes, on the training image with the transformed image patches, and learning the pedestrian detector by using the transformed image patches in which the pedestrians are more difficult to detect by the pedestrian detector than the one or more image patches from the training image, wherein the learning the pedestrian detector includes (i) instructing the pedestrian detector to generate pedestrian detection information for training by detecting the transformed pedestrians located in the transformed training image, (ii) instructing a first loss layer to calculate one or more first losses by referring to each piece of the pedestrian detection information for training and its corresponding GT (Ground Truth), and (iii) learning at least part of one or more parameters of the pedestrian detector to minimize the first losses,
wherein, at the process of (I), the learning device resizes at least one of the image patches such that the image patches have a same size, and instructs the adversarial style transformer to output the transformed image patches with the same size, and
wherein, at the process of (II), the learning device resizes the transformed image patches with the same size such that each of the transformed image patches has its own corresponding original size before the transformation, and then generates the transformed training image.

14. The learning device of claim 13, wherein, at the process of (II), the processor instructs a discriminator to generate each of pedestrian scores for training representing each of probabilities of each of the transformed image patches being each of the pedestrians for training, and to further learn at least part of one or more parameters of the adversarial style transformer to maximize the pedestrian scores for training and the first losses.

15. The learning device of claim 14, wherein the discriminator is an image classifier which includes either (i) one or more convolutional layers and at least one fully connected layer, or (ii) a fully convolutional network.

16. The learning device of claim 14, wherein, at the process of (II), the processor instructs a second loss layer to calculate one or more second losses by referring to each of the pedestrian scores for training and its corresponding GT, and to learn at least part of one or more parameters of the discriminator to minimize the second losses.

17. The learning device of claim 13, wherein the adversarial style transformer includes an encoder having one or more convolutional layers for applying one or more convolution operations to the image patches, and a decoder having one or more deconvolutional layers for applying one or more deconvolution operations to at least one feature map outputted from the encoder.

18. The learning device of claim 13, wherein the training image is acquired from one of (i) the pedestrian detector outputting pedestrian detection information for testing including the bounding boxes by detecting pedestrians for testing located in at least one test image acquired from a surveillance camera, and (ii) a database storing the training image with its own true labels corresponding to the bounding boxes.

19. A testing device for a pedestrian detector for testing to be used for robust surveillance based on image analysis, comprising:
at least one memory that stores instructions; and
at least one processor, on condition that (1) a learning device has generated one or more image patches for training by cropping each of regions for training, corresponding to each of the bounding boxes for training, on at least one training image, which includes each of the bounding boxes for training corresponding to each of pedestrians for training generated thereon, and has instructed an adversarial style transformer to generate one or more transformed image patches for training by converting each of the pedestrians for training corresponding to each of the image patches for training into each of transformed pedestrians for training capable of impeding a detection for training by the pedestrian detector, and (2) the learning device has generated at least one transformed training image by replacing each of the regions for training, corresponding to each of the bounding boxes for training, on the training image with the transformed image patches for training, and has learned the pedestrian detector by using the transformed image patches in which the pedestrians are more difficult to detect by the pedestrian detector than the one or more image patches from the training image, wherein the learning of the pedestrian detector included (i) instructing the pedestrian detector to generate pedestrian detection information for training by detecting the transformed pedestrians for training located in the transformed training image, (ii) instructing a first loss layer to calculate one or more first losses by referring to each piece of the pedestrian detection information for training and its corresponding GT (Ground Truth), and (iii) learning at least part of one or more parameters of the pedestrian detector to minimize the first losses; configured to execute the instructions to: perform processes of: (I) if at least one test image with each of bounding boxes for testing corresponding to each of pedestrians for testing generated thereon is acquired, generating one or more image patches for testing by cropping each of regions for testing, corresponding to each of the bounding boxes for testing, on the test image, and instructing an adversarial style transformer to generate one or more transformed image patches for testing by converting each of the pedestrians for testing corresponding to each of the image patches for testing into each of transformed pedestrians for testing capable of impeding a detection for testing by the pedestrian detector, and (II) generating at least one transformed test image by replacing each of the regions for testing, corresponding to each of the bounding boxes for testing, on the test image with the transformed image patches for testing, and instructing the pedestrian detector to generate pedestrian detection information for testing by detecting the transformed pedestrians for testing located in the transformed test image, wherein, at the process of (I), the processor resizes at least one of the image patches for testing such that the image patches for testing have a same size, and instructs the adversarial style transformer to output the transformed image patches for testing with the same size, and wherein, at the process of (II), the processor resizes the transformed image patches for testing with the same size such that each of the transformed image patches for testing has its own corresponding original size before the transformation, and then generates the transformed test image.

20. The testing device of claim 19, wherein, at the process of (II), the processor instructs a discriminator to generate each of pedestrian scores for testing representing each of probabilities of each of the transformed image patches for testing being each of the pedestrians for testing.

21. The testing device of claim 20, wherein the discriminator is an image classifier which includes either (i) one or more convolutional layers and at least one fully connected layer, or (ii) a fully convolutional network.

22. The testing device of claim 20, wherein, at the process of (2), the learning device has instructed a second loss layer to calculate one or more second losses by referring to each of the pedestrian scores for training and its corresponding GT, and to learn at least part of one or more parameters of the discriminator to minimize the second losses.

23. The testing device of claim 19, wherein the adversarial style transformer includes an encoder having one or more convolutional layers for applying one or more convolution operations to the image patches for testing, and a decoder having one or more deconvolutional layers for applying one or more deconvolution operations to at least one feature map for testing outputted from the encoder.

24. The testing device of claim 19, wherein the training image has been acquired from one of (i) the pedestrian detector outputting the pedestrian detection information for testing including the bounding boxes for testing by detecting the pedestrians for testing located in the test image acquired from a surveillance camera, and (ii) a database storing the training image with its own true labels corresponding to the bounding boxes for training.

* * * * *